United States Patent
Causse et al.

(10) Patent No.: US 9,077,242 B2
(45) Date of Patent: Jul. 7, 2015

(54) CONVERTER AND METHOD WHICH REMAINS BIASED FOR OPERATION IN THE PULSE FREQUENCY MODULATION MODE AND PULSE WIDTH MODULATION MODE

(71) Applicant: Semiconductor Components Industries, LLC, Phoenix, AZ (US)

(72) Inventors: Olivier Causse, Leguevin (FR); Fernandes Henrique, Toulouse (FR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 195 days.

(21) Appl. No.: 13/629,406

(22) Filed: Sep. 27, 2012

(65) Prior Publication Data

US 2014/0084886 A1    Mar. 27, 2014

(51) Int. Cl.
*H02M 3/158* (2006.01)
*H02M 1/00* (2007.01)

(52) U.S. Cl.
CPC ...... *H02M 3/158* (2013.01); *H02M 2001/0025* (2013.01); *H02M 2001/0032* (2013.01); *Y02B 70/16* (2013.01)

(58) Field of Classification Search
CPC .............................................. H02M 2001/0032
USPC ........................................ 323/282, 284, 285
See application file for complete search history.

(56) References Cited

U.S. PATENT DOCUMENTS

| | | | |
|---|---|---|---|
| 7,382,114 B2 | 6/2008 | Groom | |
| 7,605,576 B2 | 10/2009 | Kanakubo | |
| 2004/0257055 A1 | 12/2004 | Aioanei | |
| 2009/0079408 A1* | 3/2009 | Qiao et al. | 323/283 |
| 2009/0218999 A1 | 9/2009 | Kikuchi | |
| 2010/0320983 A1* | 12/2010 | Wu | 323/283 |
| 2011/0051472 A1* | 3/2011 | Zhang et al. | 363/21.18 |
| 2011/0062926 A1* | 3/2011 | Qiu et al. | 323/282 |
| 2011/0221407 A1* | 9/2011 | Kato | 323/271 |
| 2012/0091981 A1* | 4/2012 | Komiya | 323/282 |

OTHER PUBLICATIONS

3-MHz 2A Step Down Converter in 2×2 SON Package, DataSheet, SLVS833A, Product Folder Link(s) TPS62065, TPS62067, Mar. 2010, pp. 1-28, Texas Instruments Incorporated, www.ti.com.

* cited by examiner

*Primary Examiner* — Harry Behm
(74) *Attorney, Agent, or Firm* — Rennie William Dover

(57) ABSTRACT

In accordance with an embodiment, a DC-DC converter is provided comprising a single regulation loop that drives a control circuit, wherein the control circuit selects between operation in a pulse width modulation operating mode and a pulse frequency modulation operating mode, the single regulation loop including a compensation loop, and wherein biasing of the compensation loop is maintained in response to selecting between the pulse width modulation and the pulse frequency modulation operating modes.

14 Claims, 6 Drawing Sheets

CONVERTER AND METHOD WHICH REMAINS BIASED FOR OPERATION IN THE PULSE FREQUENCY MODULATION MODE AND PULSE WIDTH MODULATION MODE

BACKGROUND

The present invention relates, in general, to electronics and, more particularly, to methods of forming semiconductor devices and structure.

Power converters are used in a variety of electronic products including automotive, aviation, telecommunications, and consumer electronics. Power converters such as Direct Current to Direct Current ("DC-DC") switching converters have become widely used in portable electronic products such as laptop computers, personal digital assistants, pagers, cellular phones, etc. which are typically powered by batteries. DC-DC converters may include several regulation modes to maximize their efficiency over a load range. For example, it may be desirable to operate the DC-DC converter in a Pulse Frequency Modulation (PFM) operating mode for light load conditions and in a Pulse Width Modulation (PWM) operating mode for higher load conditions. Typically, these operating modes are optimized to provide the best efficiency in accordance with the best load line transient performance and load line regulation performance. A drawback with these systems is that regulation of the output voltage is degraded when the converter switches between the PFM and PWM operating modes.

Accordingly, it would be advantageous to have a circuit and a method for providing voltage regulation when switching between operating modes. It is desirable for the circuit and method to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

Figure 1:
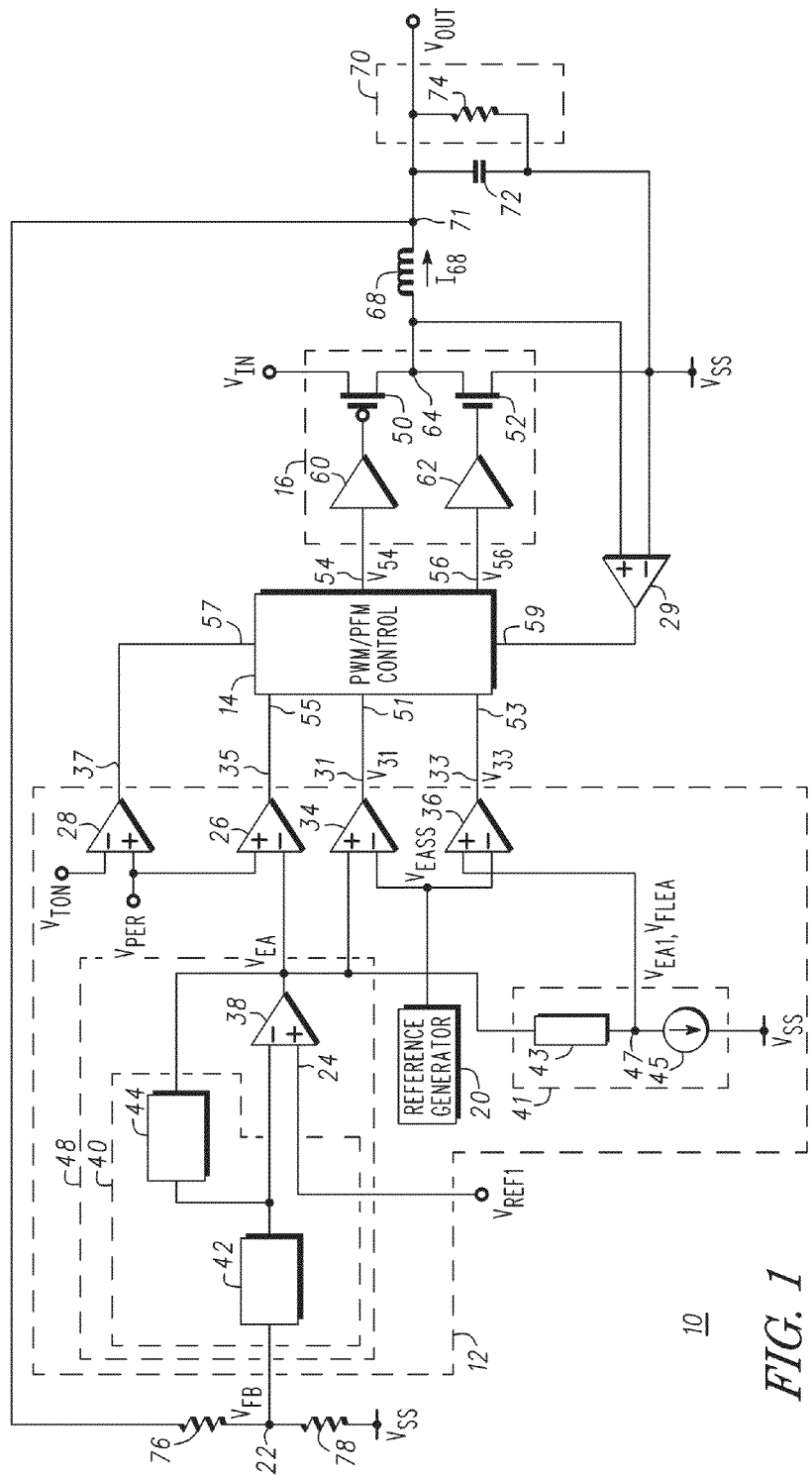
FIG. 1 is a schematic of a portion of a converter circuit in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain n-channel or p-channel devices, or certain n-type or p-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

It should be noted that a logic zero voltage level ($V_L$) is also referred to as a logic low voltage or logic low voltage level and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level, a logic high voltage, or a logic one voltage and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

Generally the present invention provides a converter and a method for operating the converter in a plurality of operating modes wherein the converter remains biased to operate in the plurality of operating modes. In accordance with an embodiment, the converter includes an analog loop control circuit connected to an output stage through a control circuit that configures the converter circuit to operate in a pulse width modulation (PWM) operating mode or a pulse frequency modulation (PFM) operating mode.

In accordance with another embodiment, the converter comprises a single regulation loop that drives a control circuit that selects between operation in a pulse width modulation operating mode and pulse frequency modulation operating mode, wherein the control circuit maintains biasing conditions in response to operating in the pulse width modulation and the pulse frequency modulation operating modes.

In accordance with another embodiment, a method for operating the converter is provided. An error signal is compared with a reference signal to generate a comparison signal. In response to the comparison signal, the converter may be shifted between a pulse width modulation operating mode and a pulse frequency modulation operating mode, wherein the converter remains biased for operating in the pulse width modulation operating mode and the pulse frequency modulation operating mode because regulation of both operating modes is accomplished using a single compensation loop, i.e., single-loop regulation. Since the converter remains biased while in these operating modes, the converter is able to switch or shift between operating modes without degrading the performance of the converter in response to operating mode changes, e.g., when changing from a PWM operating mode to a PFM operating mode or from a PFM operating mode to a PWM operating mode.

FIG. 1 is a circuit schematic of a DC-DC converter 10 in accordance with an embodiment of the present invention. What is shown in FIG. 1 is DC-DC converter 10 comprising an analog loop control circuit 12 coupled to an output stage 16 through an operating mode control circuit 14. Circuit 12 may be referred to as a regulation loop or an analog control loop circuit and operating mode control circuit 14 may be referred to as a PWM/PFM control circuit, a mode control circuit, or an operating mode control network. By way of example, analog loop control circuit 12 may include a reference generator 20, comparators 26, 28, 29, 34, and 36, an error amplifier 38, a feedback network 40, a PFM control network 41, and may have inputs 22 and 24 and outputs 31, 33, 35, and 37. Error amplifier 38 and feedback network 40 serve as a compensation loop 48. PFM control network 41 may be referred to as a tripping network, a PFM alarm network, or a fast PFM tripping network. More particularly, comparators 34 and 36 each have an inverting input and a noninverting input, wherein their inverting inputs are connected together and to an output of reference generator 20. The inverting inputs of comparators 34 and 36 are coupled for receiving a reference signal $V_{EASS}$ from reference generator 20. Error amplifier 38 has an inverting input, a noninverting input, and an output and is configured in a negative feedback configuration. In accordance with an embodiment, a feedback network 40 is connected between the inverting input and the output of error amplifier 38, where error amplifier and feedback network 40 are referred to as compensation loop 48. The noninverting input of error amplifier 38 may be connected to or, alternatively, serve as input 24 and may be coupled for receiving a reference voltage $V_{REF1}$. By way of example, feedback network 40 is comprised of an impedance structure 42 having a terminal connected to the inverting input of error amplifier 38 and a terminal coupled for receiving a feedback voltage $V_{FB}$ at node 22. Feedback network 40 further includes an impedance structure 44 having a terminal connected to the inverting input of error amplifier 38 and a terminal connected to the output of error amplifier 38, which output is connected to the noninverting input of comparator 34. It should be noted that impedance structures 42 and 44 in cooperation with error amplifier 38 form the single compensation loop of the DC/DC converter 48.

PFM control network 41 may include a terminal connected to the noninverting input of comparator 34 and a terminal connected to the noninverting input of comparator 36. Thus, PFM control network 41 may be connected between the noninverting inputs of comparators 34 and 36. By way of example, PFM control network 41 is comprised of a resistor 43 and a current source 45, wherein resistor 43 has a terminal connected to the noninverting input of comparator 34 and a terminal connected to the noninverting input of comparator 36 and current source 45 has a terminal commonly connected to the noninverting input of comparator 36 and to the terminal of resistor 43 that is connected to the noninverting input of comparator 36 to form a node 47. PFM control network 41 generates a signal $V_{EA1}$ at node 47 that is a linear function of error amplifier output signal $V_{EA}$. Output signal $V_{EA1}$ is transmitted to the noninverting input of comparator 36. Signal $V_{EA}$ may be referred to as an error signal and signal $V_{EA1}$ may be referred to as an adjusted error signal. The configuration of PFM control network 41 is not a limitation of the present invention. For example, PFM control network 41 may be comprised of a linear function generator that generates an output signal $V_{FLEA}$ that is a linear function of an input signal $V_{EA}$. Output signal $V_{FLEA}$ is transmitted to the noninverting input of comparator 36.

The output of comparator 34 may be connected to or, alternatively, serves as output 31 and the output of comparator 36 may be connected to or, alternatively, serves as output 33 of analog loop control circuit 12. Thus, error signal $V_{EA}$, adjusted error signal $V_{EA1}$, and comparison signals $V_{31}$ and $V_{33}$ are generated using a single compensation or regulation loop.

Comparator 26 has an inverting input connected to the output of error amplifier 38, a noninverting input coupled for receiving a periodic signal $V_{PER}$ and an output that is coupled to or, alternatively, serves as output 35 of analog loop control circuit 12. Comparator 28 has an inverting input coupled for receiving a reference signal $V_{TON}$, a noninverting input connected to the noninverting input of comparator 26 and coupled for receiving periodic signal $V_{PER}$, and an output that is coupled to or, alternatively, serves as output 37 of analog loop control circuit 12.

PWM/PFM control circuit 14 has inputs 51, 53, 55, 57, and 59 and outputs 54 and 56. In accordance with an embodiment, inputs 51, 53, 55, and 57 are connected to outputs 31, 33, 35, and 37, respectively, of analog loop control circuit 12. An embodiment of a PWM/PFM control circuit 14 is further described with reference to FIG. 2.

Output stage 16 includes transistors 50 and 52, each having a control electrode, e.g., a gate and a pair of current carrying electrodes, e.g., a source and a drain. By way of example, transistor 50 is a p-channel field effect transistor and transistor 52 is an n-channel field effect transistor. The gate of transistor 50 is connected to output 54 through a driver 60 and the source of transistor 50 is coupled for receiving an input voltage $V_{IN}$. The gate of transistor 52 is connected to output 56 through a driver 62, the drain of transistor 52 is connected to the drain of transistor 50, and the source of transistor 52 is coupled for receiving a source of operating potential $V_{SS}$. By way of example, operating potential $V_{SS}$ is a ground potential. The commonly connected current carrying electrodes, i.e., drains, of transistors 50 and 52 form a node 64. Drivers 60 and 62 may be referred to as drive circuits or driver circuits.

A zero crossing detector 29 is connected between node 64 and input 59 of PWM/PFM control circuit 14. By way of example, zero crossing detector 29 comprises a comparator having an inverting input coupled for receiving, for example, source of operating potential $V_{SS}$, a noninverting input connected to node 64, and an output connected to input 59.

An inductor 68 has a terminal connected to node 64 and a terminal connected to a load 70 at a node 71 and may conduct a current $I_{68}$. By way of example, load 70 is a resistor 74 having a terminal connected to inductor 68 and a terminal coupled for receiving source of operating potential $V_{SS}$. A capacitor 72 is coupled between node 71 and source of operating potential $V_{SS}$. Inductor 68 and capacitor 72 form an external filter for DC/DC converter 10.

Node 71 is connected to input 22 through resistors 76 and 78. More particularly, resistor 76 has a terminal connected to node 71 and a terminal connected to input 22 and resistor 78 has a terminal connected to input 22 and a terminal coupled for receiving source of operating potential $V_{SS}$. It should be noted that resistors 76 and 78 are optional circuit elements that may be used in external feedback configurations. However, other feedback networks may be employed or, alternatively, resistors 76 and 78 may be absent and node 71 can be connected directly to input 22.

Output signal $V_{OUT}$ appears at node 71.

Figure 2:
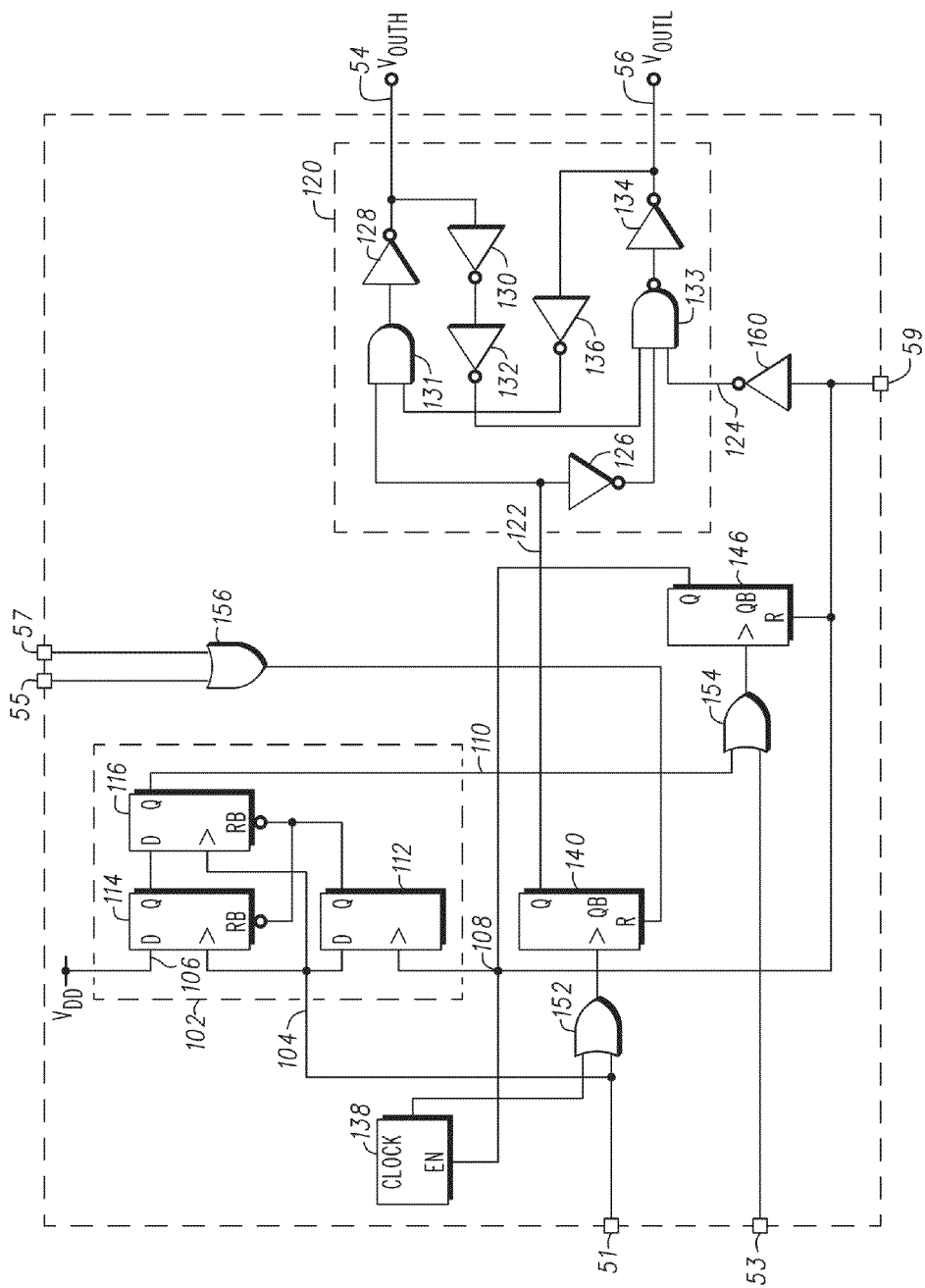
FIG. 2 is a schematic of a portion of a converter circuit in accordance with another embodiment of the present invention.

FIG. 2 is a circuit schematic of PWM/PFM control circuit 14 in accordance with an embodiment of the present invention. What is shown in FIG. 2 is a counter 102, a driver 120, a clock 138, flip-flops 140 and 146, logic gates 152, 154, and 156, and an inverter 160. By way of example, counter 102 is comprised of flip-flops 112, 114, and 116 and has inputs 104, 106, and 108 and an output 110. Flip-flop 112 has a data input commonly connected to the clocking inputs of flip-flops 114 and 116, which commonly connected inputs are coupled to or, alternatively, serve as an input 104 of counter 102. A data input of flip-flop 114 is connected to or, alternatively, serves as an input 106 of counter 102. Input 106 is coupled for receiving a source of operating potential such as, for example, $V_{DD}$. Flip-flop 112 has a clocking input that is coupled to or, alternatively, serves as input 108 of counter 102 and a data output connected to the active low reset inputs of flip-flops 114 and 116. Flip-flop 116 has a data input connected to a data output of flip-flop 114 and a data output that is coupled to or, alternatively, serves as output 110 of counter 102.

Logic gate 152 is an OR gate having an input connected to an output of clock 138 and an input connected to input 104 of counter 102 to form a commonly connected input which is connected to or serves as input 51 of PWM/PFM control circuit 14.

Logic gate 154 is an OR gate having an input connected to output 110 of counter 102 and an input connected to input 108 of counter 102 to form a commonly connected input which is connected to input 53 of PWM/PFM control circuit 14.

Flip-flop 140 has a clocking input connected to the output of OR gate 152, a reset input, and a data output. Logic gate 156 is an OR gate having an input connected to or, alternatively, serving as input 55 of PWM/PFM control circuit 14 and an input connected to or, alternatively, serving as input 57 of PWM/PFM control circuit 14. It should be noted that logic gates 152, 154, and 156 are not limited to being OR gates. They may be, for example, NAND gates or the like or other logic configurations.

Flip-flop 146 has a clocking input connected to the output of OR gate 154, a reset input commonly connected to input 108 of counter 102, the input of inverter 160, and to input 59 of PWM/PFM control circuit 14, and a data output connected to an enable input of clock 138.

Driver 120 has an input 122 connected to the data output of flip-flop 140 and an input 124 connected to input 59 of PWM/PFM control circuit 14 through inverter 160. By way of example, driver 120 includes inverters 126, 128, 130, 132, 134, and 136, and logic gates 131 and 133, logic gate 131 is a two-input AND gate, and logic gate 133 is a three-input NAND gate. The number of inputs for logic gates 131 and 133 are not limitations of the present invention. AND gate 131 has an input connected to an input of inverter 126 and to an output of flip-flop 140 to form a commonly connected input that is connected to or, alternatively, serves as input 122 of driver 120. AND gate 131 also has an input connected to the output of NAND gate 133 through inverters 134 and 136 and an output connected to the input of inverter 128. NAND gate 133 has an input connected to the output of inverter 126, an input connected to the output of inverter 160, an input connected to the output of inverter 128 through inverters 130 and 132, and an output connected to the input of inverter 134. It should be noted that the output of inverter 128 is connected to the input of inverter 130 and is connected to or, alternatively, serves as output 54 of PWM/PFM control circuit 14 and the output of inverter 134 is connected to the input of inverter 136 and is connected to or, alternatively, serves as output 56 of PWM/PFM control circuit 14. Output signal $V_{OUTH}$ appears at output 54 and output signal $V_{OUTL}$ appears at output 56.

Converter 10 operates in a plurality of modes depending on the load condition. For example, in response to a light current load converter 10 operates in a PFM mode and in response to a higher current load it operates in a PWM mode. Converter 10 includes a single loop for PWM and PFM modes of operation, thus the regulation loop is biased to operate in the PWM operating mode in response to changing from the PFM to PWM operating mode. More particularly, reference generator 20 generates a reference signal $V_{EASS}$ which is transmitted to the inverting inputs of comparators 34 and 36, which references comparators 34 and 36 to voltage $V_{EASS}$. Reference signal $V_{EASS}$ may be an image of a steady state value or a DC value of output voltage $V_{EA}$ from error amplifier 38. Output voltage $V_{EA}$ is set by the regulation loop to adjust the switch duty cycle of transistors 50 and 52 to provide a desired DC output voltage $V_{OUT}$ at node 71 shown in FIG. 1. The absolute value of reference signal $V_{EASS}$ may be a function of output voltage $V_{OUT}$, input voltage $V_{IN}$, and the ramp compensation voltage. It should be noted that output voltage $V_{EA}$ from error amplifier 38 is input into the inverting input of comparator 34 and is thus compared with reference signal $V_{EASS}$ to generate a comparison signal $V_{31}$ at output 31 of analog loop control circuit 12.

Figure 3:
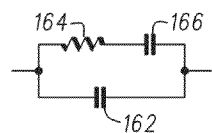
FIG. 3 is a schematic of feedback elements suitable for use in the converter circuit shown in FIG. 1.

FIG. 3 is a schematic of a circuit suitable for use as impedance structure 44 of FIGS. 1 and 2. Impedance structure 44 may be comprised of a capacitor 162 connected in parallel with a series connected resistor 164 and capacitor 166.

Figure 4:
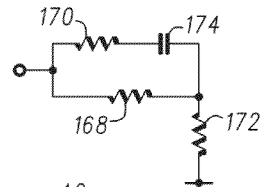
FIG. 4 is a schematic of feedback elements suitable for use in the converter circuit shown in FIG. 1.

FIG. 4 is a schematic of a circuit suitable for use as impedance structure 42 of FIG. 1. Impedance structure 42 may be comprised of a resistor 168 connected in parallel with a series connected resistor 170 and capacitor 174 and a resistor 172 having a terminal connected to the commonly connected terminals of capacitor 174 and resistor 168. It should be noted that the configurations of impedance structures 44 and 42 shown in FIGS. 3 and 4, respectively, are not limitations of the present invention. For example, resistor 172 may be omitted or there may be fewer or a greater number of circuit elements.

Figure 5:
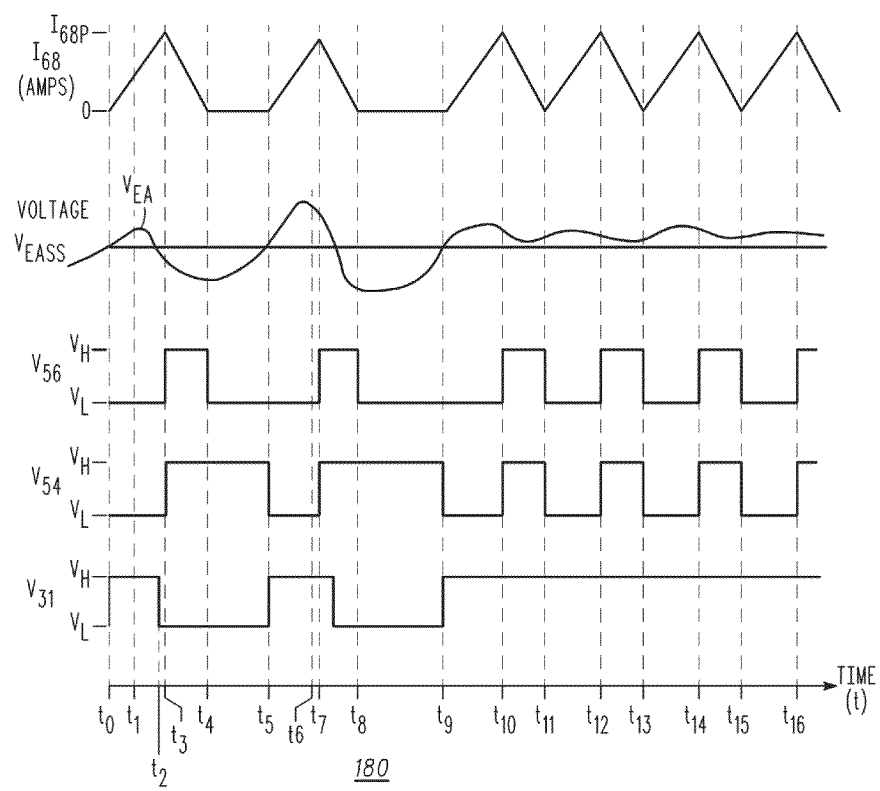
FIG. 5 is a timing diagram suitable for use in the converter circuit shown in FIG. 1.

FIG. 5 is a timing diagram 180 illustrating current $I_{68}$ flowing through inductor 68, output voltage $V_{EA}$ from error amplifier 38, reference signal $V_{EASS}$, and comparator output voltage $V_{31}$. PWM/PFM control circuit 14 controls regulation in the PFM mode, where a PFM pulse is started in response to output voltage $V_{EA}$ becoming greater than reference signal $V_{EASS}$. At time $t_0$, inductor current $I_{68}$ increases from a zero current level, PMOS transistor 50 is on and NMOS transistor 52 is off, and voltages $V_{54}$ and $V_{56}$ are at a logic low voltage level $V_L$. Reference voltage $V_{EASS}$ is at a substantially constant voltage level and voltage $V_{EA}$ is increasing but substantially equal to voltage $V_{EASS}$. In response to voltage $V_{EA}$ becoming greater than reference voltage $V_{EASS}$ at a time $t_{0+}$, comparator 34 generates a logic high voltage at output 31, i.e., voltage $V_{31}$ transitions to a logic high voltage level which appears at input 51 of PWM/PFM control circuit 14. It should be noted that the nomenclature $t_{0+}$ is used to indicate a time close to but greater than time $t_0$. Voltage $V_{EA}$ is still greater than reference voltage $V_{EASS}$ between times $t_1$ and $t_2$, but decreases during this time interval. At time $t_2$, error amplifier output voltage $V_{EA}$ is at substantially the same voltage level as reference voltage $V_{EASS}$ and continues decreasing and voltage $V_{31}$ at the output of comparator 34 transitions from a logic high voltage level to a logic low voltage level.

At time $t_3$ inductor current $I_{68}$ reaches a positive peak current level $I_{68P}$ and begins to decrease in response to transistor 50 turning off and transistor 52 turning on. In response to transistor 50 being off and transistor 52 being on, voltages $V_{54}$ and $V_{56}$ transition to a logic high voltage level $V_H$. At time $t_4$, inductor current $I_{68}$ is clamped at a current level of zero in response to zero crossing detection circuitry and current clamping circuitry coupled to node 64. Thus, zero crossing detector 29 turns off transistor 52 to prevent inductor current $I_{68}$ from going negative. In response to transistor 52 being off, voltage $V_{56}$ transitions to logic low voltage level $V_L$ and voltage $V_{54}$ remains at logic high voltage level $V_H$.

At time $t_5$, inductor current $I_{68}$ increases from a zero current level, reference voltage $V_{EASS}$ is at a substantially constant voltage level, and voltage $V_{EA}$ is increasing but substantially equal to voltage $V_{EASS}$. In response to voltage $V_{EA}$ becoming greater than reference voltage $V_{EASS}$ at a time $t_{5+}$, comparator 34 generates a logic high voltage at output 31, i.e., voltage $V_{31}$ transitions to a logic high voltage level which appears at input 50 of PWM/PFM control circuit 14. In response to comparison signal $V_{31}$, control signal $V_{54}$ generated by PWM/PFM control circuit 14 transitions from a logic high voltage level $V_H$ to logic low voltage level $V_L$. Similar to the nomenclature $t_{0+}$, the nomenclature $t_{5+}$ is used to indicate a time close to but greater than time $t_5$. Voltage $V_{EA}$ is decreasing at time $t_6$. At time $t_7$ inductor current $I_{68}$ reaches a positive peak current level $I_{68P}$ and begins to decrease in response to transistor 50 turning off and transistor 52 turning on. In response to transistor 50 being off and transistor 52 being on, voltages $V_{54}$ and $V_{56}$ transition to logic high voltage level $V_H$. It should be noted that a positive edge of voltage $V_{31}$ starts a PFM burst, and the negative edge can occur either during or after the $T_{ON}$ period. Thus, the PFM burst is started in response to comparison signal $V_{31}$ which is generated by comparing error signal $V_{EA}$ with reference signal $V_{EASS}$ where error signal $V_{EA}$ is greater than reference signal $V_{EASS}$. The negative edge occurs in response to voltage $V_{EA}$ going lower than voltage $V_{EASS}$.

At time $t_8$, inductor current $I_{68}$ is clamped at a current level of zero in response to zero current detection circuitry and current clamping circuitry coupled to node 64. Zero crossing detector 29 turns off transistor 52 to prevent inductor current $I_{68}$ from going negative. In response to transistor 52 turning off, voltage $V_{56}$ transitions to logic low voltage level $V_L$ while voltage $V_{54}$ remains at logic high voltage level $V_H$.

At time $t_9$, reference voltage $V_{EASS}$ is at a substantially constant voltage level, voltage $V_{EA}$ is increasing but substantially equal to voltage $V_{EASS}$, and current $I_{68}$ increases from a zero current level. In response to voltage $V_{EA}$ becoming greater than reference voltage $V_{EASS}$ at a time $t_{9+}$, comparator 34 generates a logic high voltage at output 31, i.e., voltage $V_{31}$ transitions to a logic high voltage level which appears at input 51 of PWM/PFM control circuit 14. In response to comparison signal $V_{31}$, control signal $V_{54}$ generated by PWM/PFM control circuit 14 transitions from logic high voltage level $V_H$ to logic low voltage level $V_L$. Similar to the nomenclature $t_{0+}$ and $t_{5+}$, the nomenclature $t_{9+}$ is used to indicate a time close to but greater than time $t_9$.

At time $t_{10}$, inductor current $I_{68}$ reaches a positive peak current level $I_{68P}$ and begins to decrease in response to transistor 50 turning off and transistor 52 turning on. Accordingly, output signals $V_{54}$ and $V_{56}$ transition to logic high voltage level $V_H$. It should be noted that at time $t_{10}$, error amplifier output voltage $V_{EA}$ is still greater than reference voltage $V_{EASS}$.

At time $t_{11}$, inductor current $I_{68}$ reaches a zero current level, which serves as an inflection point, and begins increasing in response to transistor 50 turning on and transistor 52 turning off. Accordingly, output signals $V_{54}$ and $V_{56}$ transition to logic low voltage level $V_L$. It should be noted that error amplifier output voltage $V_{EA}$ is still greater than reference voltage $V_{EASS}$.

At times $t_{12}$, $t_{14}$, and $t_{16}$, inductor current $I_{68}$ reaches a positive peak current level $I_{68P}$, which serves as an inflection point, and begins to decrease in response to transistor 50 turning off and transistor 52 turning on. Accordingly, output signals $V_{54}$ and $V_{56}$ transition to logic high voltage level $V_H$. It should be noted that at times $t_{12}$, $t_{14}$, and $t_{16}$ error amplifier output voltage $V_{EA}$ is still greater than reference voltage $V_{EASS}$.

At times $t_{13}$ and $t_{15}$, inductor current $I_{68}$ reaches a zero current level, which serves as an inflection point, and begins increasing in response to transistor 50 turning on and transistor 52 turning off. Accordingly, output signals $V_{54}$ and $V_{56}$ transition to logic low voltage level $V_L$. Error amplifier output voltage $V_{EA}$ is still greater than reference voltage $V_{EASS}$. It should be noted that the PFM bursts have become consecutive and that the PFM circuit generates its maximum output current. After counting several consecutive PFM bursts, PWM/PFM circuit 14 enters the PWM operating mode.

It should be noted that converter 10 includes two PFM comparators 34 and 36 that are referenced to a reference voltage $V_{EASS}$, which is the steady state or DC output voltage of the error amplifier operating in a PWM operating mode. Voltages $V_{EA}$ and $V_{EASS}$ are input to comparator 34 which control PFM regulation. Converter 10 generates a PFM pulse each time voltage $V_{EA}$ goes higher than voltage $V_{EASS}$. Thus, comparator 34 ensures DC voltage regulation in the PFM operating mode by starting a PFM burst each time voltage $V_{EA}$ goes higher than voltage $V_{EASS}$. In the PWM operating mode, the regulation loop sets the value of voltage $V_{EASS}$ to set the switching frequency duty cycle that provides the desired output voltage $V_{OUT}$. Thus, single regulation loop 12 of converter 10 includes a compensation loop and drives a control circuit 14, wherein control circuit 14 selects between operation in a pulse width modulation operating mode and a pulse frequency modulation operating mode, and wherein biasing of the compensation loop is maintained in response to selecting between the pulse width modulation and the pulse frequency modulation operating modes.

In addition, regulation loop 12 controls switching from the PFM operating mode to the PWM operating mode in response to converter 10 being unable to deliver a desired current load. Comparator 36 monitors an adjusted error voltage that may be lower than or proportional to the error voltage output by error amplifier 38 and ensures that converter 10 changes from the PFM operating mode to the PWM operating mode in response to conditions in which the load change is too fast and the consecutive high output levels of comparator 34 are too long to be detected. Thus, comparator 36 causes converter 10 to switch into the PWM operating mode before output voltage $V_{OUT}$ drops too much.

Figure 6:
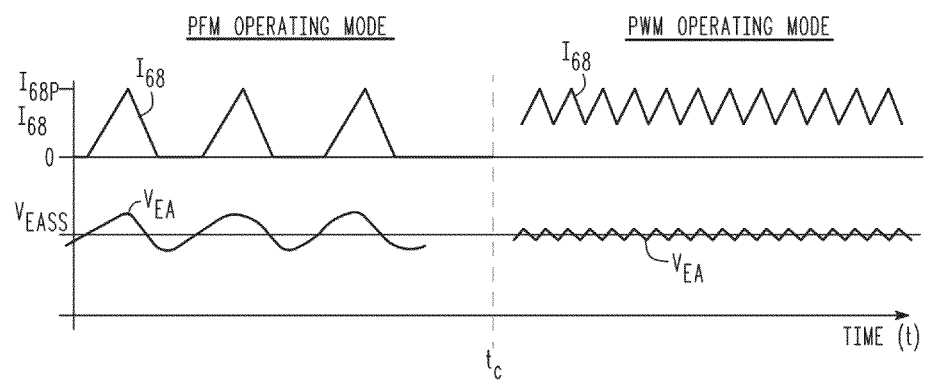
FIG. 6 is a timing diagram suitable for use in the converter circuit shown in FIG. 1.

FIG. 6 is a timing diagram 182 illustrating current $I_{68}$ flowing through inductor 68, output voltage $V_{EA}$ from error amplifier 38, and reference signal $V_{EASS}$ with respect to time. FIG. 6 illustrates converter 10 operating in the PFM operating mode before mode change time $t_c$ and operating in the PWM operating mode after mode change time $t_c$. It should be noted that in both the PFM and PWM operating modes output voltage $V_{EA}$ oscillates about reference voltage $V_{EASS}$ and that inductor current $I_{68}$ flows for longer periods of time during the PWM operating mode compared to the PFM operating mode. It should be further noted that voltage $V_{EASS}$ is predetermined as the average $V_{EA}$ value during PWM regulation. Thus, the compensation loop made up of impedance structures 42 and 44 and error amplifier 38 is biased at a similar level in PFM and PWM operating modes. This improves the PFM to PWM mode transitions as the compensation loop is already biased around its PWM steady state value. The current ripple in the PWM operating mode is lower than the current ripple in the PFM operating mode.

Figure 7:
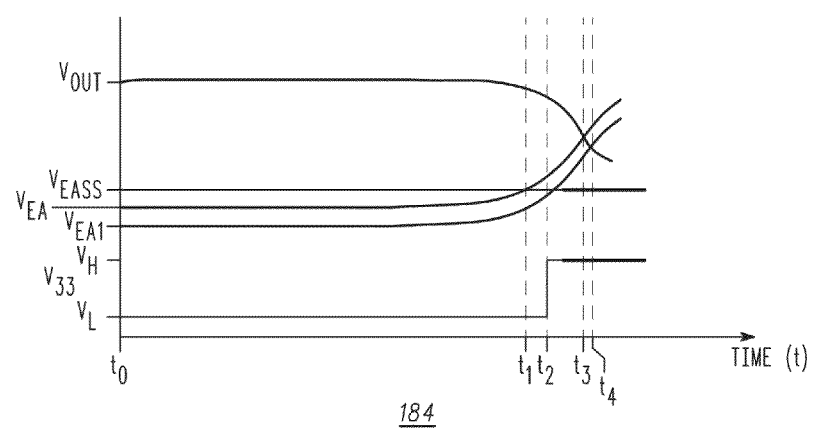
FIG. 7 is a timing diagram suitable for use in the converter circuit shown in FIG. 1.

FIG. 7 is a timing diagram 184 illustrating output voltage $V_{OUT}$, output voltage $V_{EA}$ from error amplifier 38, reference signal $V_{EASS}$, and control voltage $V_{33}$ output by comparator 36 with respect to time. From time $t_0$ to time $t_1$, DC-DC converter 10 operates in a PFM mode. In this mode, output voltage $V_{OUT}$ and reference voltage $V_{EASS}$ are at substantially constant levels. Before time $t_1$, the rate of the load change increases causing output voltage $V_{OUT}$ to decrease and voltages $V_{EA}$ and $V_{EA1}$ to increase. At time $t_1$ voltage $V_{EA}$ is substantially equal to voltage $V_{EASS}$ and increasing and at time $t_2$ voltage $V_{EA1}$ is substantially equal to voltage $V_{EASS}$ and increasing. Voltage $V_{EA1}$ increases to a level greater than reference voltage $V_{EASS}$ in response to load changes that are sufficiently fast that consecutive high comparison signal levels $V_{31}$ are too long to detect. In response to voltage $V_{EA1}$ being greater than reference voltage $V_{EASS}$, comparator 36 outputs a logic high voltage comparison signal and PWM/PFM control circuit 14 configures DC/DC converter 10 to enter the PWM operating mode before the output voltage $V_{OUT}$ decreases to a level that degrades the performance of DC-DC converter 10.

Figure 8:
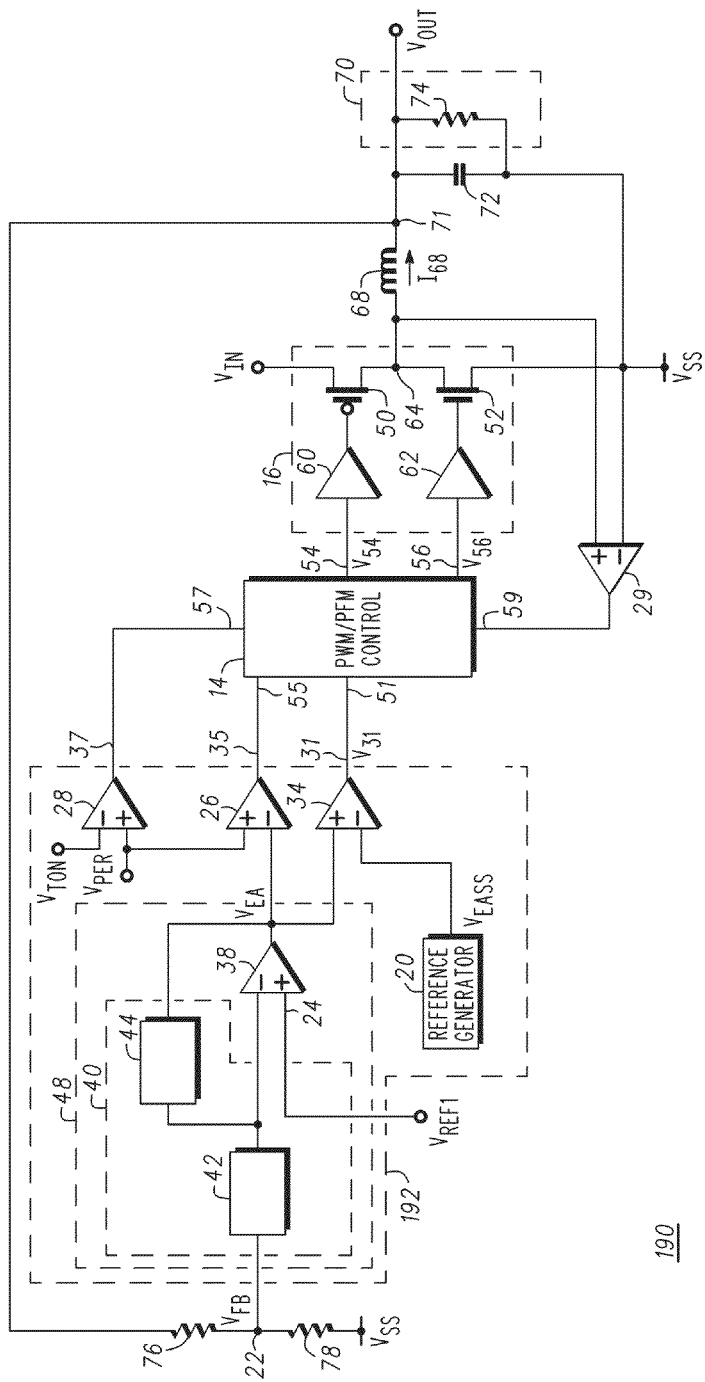
FIG. 8 is a schematic of a portion of a converter circuit in accordance with another embodiment of the present invention.

FIG. 8 is a circuit schematic of a DC-DC converter 190 in accordance with another embodiment of the present invention. DC-DC converter 190 includes an analog loop control circuit 192 coupled to an output stage 16 through an operating mode control circuit 14. Operating mode control circuit 14 and output stage 16 have been described with reference to FIG. 1. Analog loop control circuit 192 is similar to analog loop control circuit 12 in that it includes error amplifier 38, feedback network 40, reference generator 20, and comparators 34, 26, and 28 which have been described with reference to FIGS. 1-4. Error amplifier 38 and feedback network 40 form compensation loop 48. Analog loop control circuit 192 differs from control circuit 12 in that comparator 36 and PFM control network 41 are absent from analog loop control circuit 192.

Figure 9:
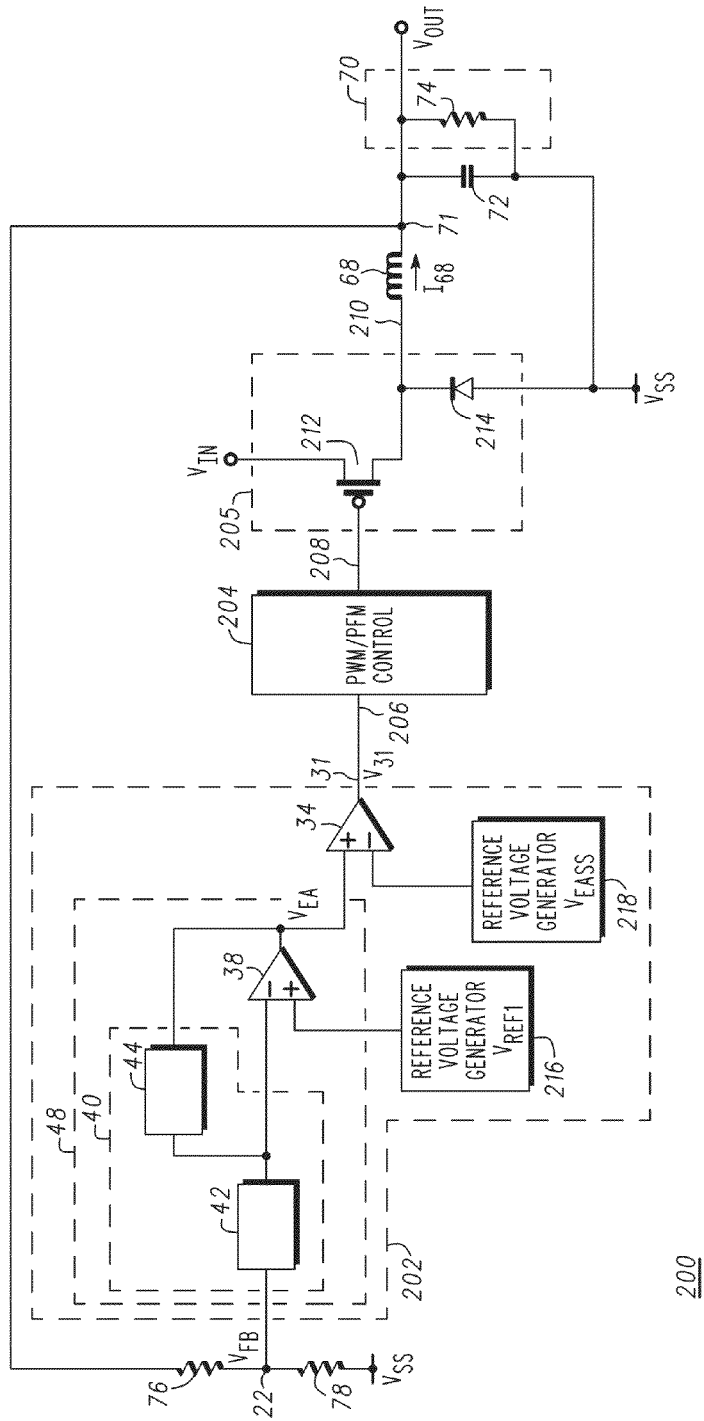
FIG. 9 is a schematic of a portion of a converter circuit in accordance with another embodiment of the present invention.

FIG. 9 is a circuit schematic of a DC-DC converter 200 in accordance with another embodiment of the present invention. What is shown in FIG. 9 is DC-DC converter 200 comprising an analog loop control circuit 202 coupled to an output stage 205 through an operating mode control circuit 204. Analog loop control circuit 202 may be referred to as a regulation loop and operating mode control circuit 204 may be referred to as a PWM/PFM control circuit, a mode control circuit, or an operating mode control network. By way of example, analog loop control circuit 202 may include a reference voltage generator 216 for generating a reference voltage $V_{REF1}$, a reference voltage generator 218 for generating a reference voltage $V_{EASS}$, comparator 34, an error amplifier 38, a feedback network 40, and may have an input 22 and an output 31 at which output signal $V_{31}$ appears. Error amplifier 38 and feedback network 40 form compensation loop 48. Comparator 34 has an inverting input and a noninverting input, wherein the inverting input is coupled for receiving a reference voltage signal $V_{EASS}$ from reference generator 218. Error amplifier 38 has an inverting input, a noninverting input, and an output and is configured in a negative feedback configuration. In accordance with an embodiment, a feedback network 40 is connected between the inverting input and the output of error amplifier 38. The noninverting input of error amplifier 38 may be coupled for receiving a reference voltage $V_{REF1}$ from reference generator 216. Error amplifier 38, feedback network 40, resistors 76 and 78 have been described with reference to FIG. 1.

PWM/PFM control circuit 204 has an input 206 and an output 208. In accordance with an embodiment, input 206 is connected to output 31 of analog control loop 202.

Output stage 205 includes a transistor 212 connected to a diode 214. Transistor 212 has a control electrode, e.g., a gate, and a pair of current carrying electrodes, e.g., a source and a drain. By way of example, transistor 212 is a p-channel field effect transistor. The source of transistor 50 is coupled for receiving an input voltage $V_{IN}$, the gate is connected to output 208, and the drain is connected to the cathode of diode 214 at node 210. Transistor 50 is not limited to being a p-channel field effect transistor. The anode of diode 214 coupled for receiving a source of operating potential $V_{SS}$. By way of example, operating potential $V_{SS}$ is a ground potential.

Inductor 68 has a terminal connected to node 210 and a terminal connected to node 71, which is connected to feedback network 40 in a feedback configuration. Output stage 70 and capacitor 72 have been described with reference to FIG. 1.

By now it should be appreciated that a converter suitable for operating in PWM and PFM operating modes and a method for operating the converter have been provided. In accordance with embodiments, the converter is a multi-mode converter having a single regulation loop for operation in the PWM and PFM modes, wherein the single regulation loop maintains biasing of the converter for operation in the different modes without degrading its operation, i.e., the converter is biased so that it is suitable for PWM operation during the PWM and PFM operating modes. Converters such as, for example, converters 10 and 190, are capable of operating in PWM and PFM operating modes and are referred to as multi-mode converters.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for operating a multi-mode converter, comprising:
    comparing an error signal with a reference signal to generate a first comparison signal;
    operating in a pulse frequency modulation mode in response to the comparison signal; and
    shifting from the pulse frequency modulation mode to a pulse width modulation mode in response to a plurality of zero crossing detection events, wherein the multi-mode converter remains biased for operating in the pulse frequency modulation mode and the pulse width modulation mode.

2. The method of claim 1, further including:
    comparing an adjusted error signal with the reference signal to generate a second comparison signal; and
    shifting from the pulse frequency modulation mode to the pulse width modulation mode in response to the second comparison signal.

3. The method of claim 2, using a single regulation loop to generate the error signal, the adjusted error signal, the first comparison signal and the second comparison signal.

4. The method of claim 1, further including biasing the multi-mode converter for pulse width modulation operation during the pulse frequency modulation mode and pulse width modulation mode.

5. A method for operating a multi-mode controller, comprising:
providing a first control circuit having a first input and a first output;
coupling a second control circuit to the first control circuit, wherein the second control circuit has a first input, a first output, and a second output, the first input coupled to the first output of the first control circuit;
coupling an output stage to the second control circuit, the output stage having a first input, a second input, and an output, the first input of the output stage coupled to the first output of the second control circuit, the second input of the output stage coupled to the second output of the second control circuit, and the output of the output stage coupled to the first input of the first control circuit, wherein the first control circuit, the second control circuit, and the output stage form the multi-mode controller; and
operating the multi-mode control circuit in one of a pulse frequency modulation operating mode or a pulse width modulation operating mode in response to a current load at the output stage, wherein the multi-mode converter remains biased for operating in the pulse frequency modulation operating mode and the pulse width modulation operating mode, and further including shifting from the pulse frequency modulation operating mode to the pulse width modulation operating mode in response to a plurality of zero crossing detection events.

6. The method of claim 5, wherein providing the first control circuit, comprises:
providing an error amplifier having first and second inputs and an output;
coupling a comparator to the error amplifier, wherein the comparator has first and second inputs and an output, the first input coupled to the output of the error amplifier, and wherein the output of the comparator serves as the first output of the first control circuit; and
coupling a second comparator having first and second inputs and an output, the second input of the second comparator coupled to the second input of the first comparator, wherein the output of the second comparator serves as a second output of the first control circuit.

7. The method of claim 6, wherein coupling the output stage to the second control circuit includes providing the output stage having a first transistor having a control electrode and first and second current carrying electrodes, the control electrode coupled to the first output of the second control circuit and the first input coupled for receiving an input signal.

8. The method of claim 7, further including coupling a reference generator to the second inputs of the first and second comparators.

9. The method of claim 5, further including:
providing an error amplifier having first and second inputs and an output; and
coupling a comparator to the error amplifier, wherein the comparator has first and second inputs and an output, the first input coupled to the output of the error amplifier, and wherein the output of the comparator serves as the first output of the first control circuit.

10. The method of claim 9, further including coupling a reference generator to the second input of the comparator.

11. The method of 9, further including coupling a first impedance structure coupled between the first input and the output of the error amplifier and coupling a second impedance structure coupled to the first input of the error amplifier.

12. The method of claim 11, wherein coupling the first impedance structure between the first input and the output of the error amplifier comprises:
coupling a first capacitor to the error amplifier, the first capacitor having a first terminal and a second terminal, the first terminal of the first capacitor coupled to the first input of the error amplifier and the second terminal of the first capacitor coupled to the output of the error amplifier;
coupling a second capacitor to the output of the error amplifier, the second capacitor having a first terminal and a second terminal, the second terminal coupled to the output of the error amplifier; and
coupling a first resistor to the second capacitor, the first resistor having a first terminal and a second terminal, wherein coupling the first resistor to the second capacitor includes coupling the first terminal of the first resistor to the second terminal of the second capacitor and coupling the second terminal of the first resistor to the first input of the error amplifier.

13. The method of claim 12, wherein coupling the second impedance structure to the first input of the error amplifier comprises:
coupling a first terminal of a second resistor to the first input of the error amplifier, the second resistor having the first terminal and a second terminal;
coupling a first terminal of a third resistor to the second terminal of the second resistor, the second resistor having the first terminal and a second terminal; and
coupling a first terminal of a third capacitor to the first terminal of the second resistor and a second terminal of the third capacitor to the second terminal of the third resistor.

14. The method of claim 5, wherein operating the multi-mode control circuit in one of pulse frequency modulation operating mode or the pulse width modulation operating mode in response to a current load at the output stage includes operating in the pulse frequency modulation operating mode in response to a light current load and operating in the pulse width modulation operating mode in response to a higher current load.

* * * * *